United States Patent [19]
Yamagishi et al.

[11] Patent Number: 5,581,589
[45] Date of Patent: Dec. 3, 1996

[54] METHOD AND APPARATUS FOR PRODUCING GEL PARTICLES

[75] Inventors: Shigeru Yamagishi, Ibaraki-ken; Atsushi Hasegawa, Tokyo, both of Japan

[73] Assignee: Japan Atomic Energy Research Institute, Tokyo, Japan

[21] Appl. No.: 421,872

[22] Filed: Apr. 14, 1995

[30] Foreign Application Priority Data

Apr. 14, 1994 [JP] Japan ................... 6-075789

[51] Int. Cl.⁶ ................................ G21C 3/00
[52] U.S. Cl. .................. 376/411; 376/414; 376/422; 376/425; 252/643; 428/325; 428/331; 428/402
[58] Field of Search .................... 376/411, 414, 376/422, 425; 252/643; 428/325, 331, 402

[56] References Cited

U.S. PATENT DOCUMENTS

| | | | |
|---|---|---|---|
| 4,071,335 | 1/1978 | Barosi | 55/68 |
| 4,119,488 | 10/1978 | Barosi | 376/418 |
| 4,364,859 | 12/1982 | Ohtsuka et al. | 252/643 |
| 4,431,164 | 2/1984 | Jungo et al | 252/628 |
| 4,687,560 | 8/1987 | Tracy et al. | 204/164 |
| 4,758,469 | 7/1988 | Lange | 428/325 |
| 5,077,241 | 12/1991 | Moh et al. | 501/84 |
| 5,098,178 | 3/1992 | Ortabasi | 505/1 |
| 5,219,829 | 6/1993 | Baver et al. | 505/1 |
| 5,236,651 | 8/1993 | Garvey et al. | 264/140 |
| 5,364,522 | 11/1994 | Wang | 205/50 |
| 5,458,912 | 10/1995 | Camilletti et al. | 427/126.4 |

OTHER PUBLICATIONS

E. Vanden Bemden et al., Transactions of the American Nuclear Society, vol. 40, Apr. 26–30, 1982, pp. 55–56.
V. N. Vaidya et al., A Study of Chemical Parameters of the Internal Gelation Based SOL–GEL Process for Uranium Dioxide, 1987, pp. 324–331.

Primary Examiner—Donald P. Walsh
Assistant Examiner—Meena Chelliah
Attorney, Agent, or Firm—Banner & Witcoff, Ltd.

[57] ABSTRACT

A method and an apparatus for producing microspherical ceramic particles such as particulate ceramic fuels for use in nuclear reactors. To produce gel particles by performing microwave heating on the small droplets of a stock solution or sol that contains uranium and other elements for nuclear reactor fuels, the small droplets are allowed to fall down through a cavity resonator using microwaves having an engineering frequency of 2.45 GHz and a quartz rod is inserted into or withdrawn out of the resonator to adjust the resonant frequency so that it will lie within the spectrum width of the microwave frequency.

8 Claims, 2 Drawing Sheets

METHOD AND APPARATUS FOR PRODUCING GEL PARTICLES

BACKGROUND OF THE INVENTION

1. Field of the Invention

This invention relates to a method and an apparatus for the production by the sol-gel process of microspherical ceramic particles such as particulate ceramic fuels for use in nuclear reactors.

2. Prior Art

Particulate ceramic fuels for use in nuclear reactors are commonly produced by the sol-gel process, in which a stock solution or sol containing uranium and other fuel elements is treated with a second fluid (gas or organic liquid) to form small droplets under the resulting surface tension and a gelling agent such as ammonia is allowed to act on the droplets to gel (solidify) them, which are then heat treated for conversion to ceramic particles. This sol-gel process may be implemented by external or internal gelation. In external gelation, the gelling agent is allowed to act on the small droplets from the outside; in internal gelation, hexamethylenetetramine (HMTA) is mixed preliminarily with the stock solution or sol and the small droplets formed by interaction with the second fluid are heated to decompose the contained HMTA thermally and the decomposition product, ammonia, is used as the gelling agent.

According to a common method of internal gelation, heated silicone oil or the like is used as the second fluid and the small droplets of the stock solution or sol which are formed in that second fluid are heated up by about 80K so that HMTA is decomposed thermally, followed by gelation of the small droplets (see J. Nucl. Mater., 148 (1987) 324–331). Another approach that can be taken is the Ledergerber method, in which the small droplets of the stock solution or sol as formed within air are allowed to fall in the electric field of microwaves that have been generated within a cavity resonator (hereunder simply referred to as "resonator") so that they are heated dielectrically to decompose HMTA while gelling the small droplets (see Trans. Am. Nucl. Soc., 40 (1982) 55–56). A problem with the Ledergerber process is that the frequency specified for engineering purposes (0.915 or 2.45 GHz) is insufficient to provide a temperature elevation of about 80K that is held necessary to gel the small droplets of the stock solution or sol and the intended heating can only be accomplished by applying frequencies about ten times the engineering level (8.2–12.4 GHz).

SUMMARY OF THE INVENTION

An object of the invention is to provide a method by which dielectric heating that provides the temperature increase of about 80K necessary for causing internal gelation of the small droplets of a stock solution or sol can be accomplished using an inexpensive commercial microwave power source operating at an engineering frequency (2.45 GHz) in place of the high-output power source which was especially constructed by Ledergerber in order to apply the microwaves in the communication frequency band (X-band) to dielectric heating.

Another object of the invention is to provide an apparatus for implementing this method.

BRIEF DESCRIPTION OF THE DRAWINGS

FIG. 2 shows schematically the direction and strength of the electric field created by microwaves within two types of resonator, one being positioned to create a horizontal electric field (according to the Ledergerber method.

DETAILED DESCRIPTION OF THE INVENTION

As result of the intensive studies conducted in order to attain the objects of the invention, the present inventors found that the problem of the prior art could effectively be solved by adopting the following three design features.

Figure 1:
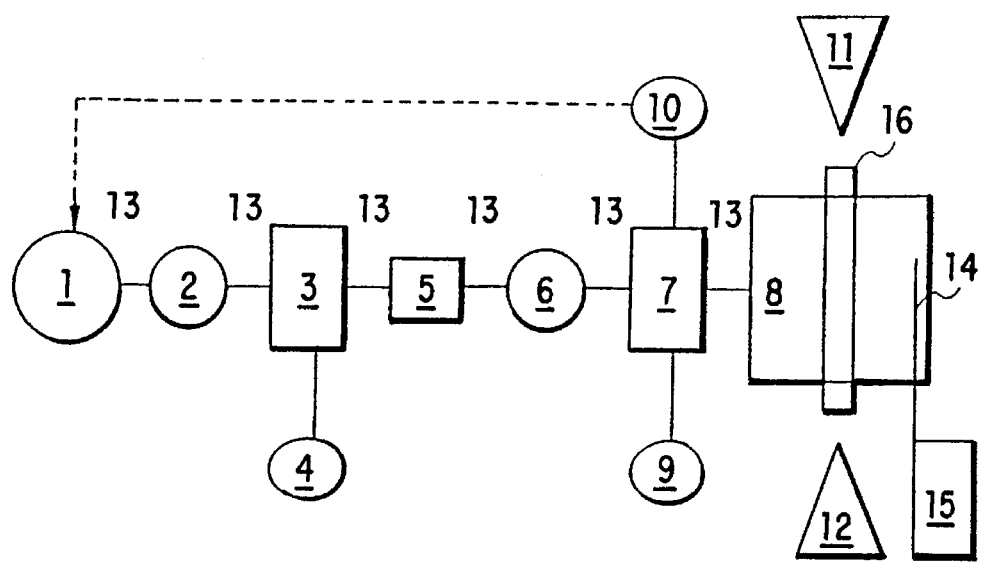
FIG. 1 is a block diagram showing an exemplary apparatus for implementing the method of the invention.

First, the overall system was configured as shown in FIG. 1, comprising a magnetron oscillator 1, circulator A designated by 2, directional coupler A designated by 3, incident and reflected wave power meter 4, stub tuner 5, circulator B designated by 6, directional coupler B designated by 7, cavity resonator 8, spectrum analyzer 9, discharge detector/interlocking signal transmitter 10, gelling stock solution or sol supplying/small droplet forming unit 11, and gel particle receptacle 12. Components 1–3 are interconnected by waveguides 13, and components 3–8 are also interconnected by waveguides 13. It should be noted here that a commercial power source consists typically of components 1–3 or 1–5.

Secondly, the resonator 8 shown in FIG. 1 was fitted with a micrometer-type drive mechanism 15 that permitted a quartz rod 14 for fine tuning of the resonant state to be inserted into or withdrawn out of the resonator 8. As in the Ledergerber process, a quartz tube 16 for protecting the resonator against fouling by the deposition of falling droplets and other contaminants was set in the center of the resonator so that the small droplets of the stock solution or sol would fall down through the center of the quartz tube 16.

Thirdly, a microwave power source commercially available for use in dielectric heating which had a frequency spectrum width of several megahertz was adapted to be capable of fine tuning over 1 MHz.

Figures 2A, 2B:
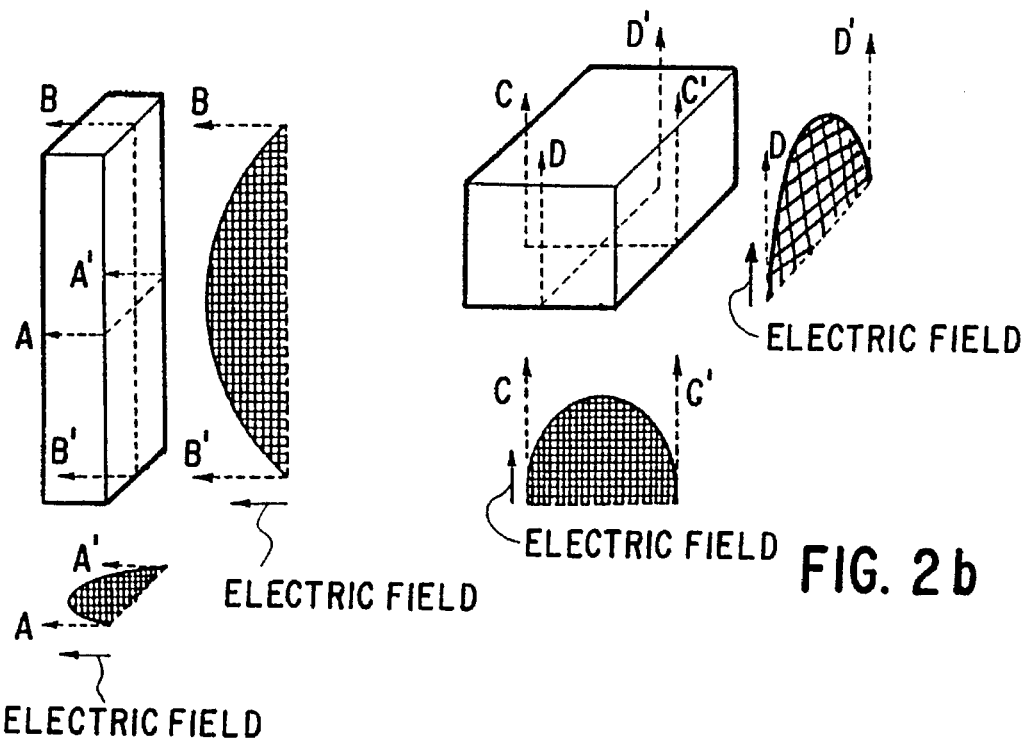
FIG. 2a) and the other being positioned to create a vertical electric field (according to the present invention.
FIG. 2b)

In addition to these three alterations, the present inventors proposed that the resonator be positioned to create a vertical electric field as shown in FIG. 2b in contrast with the layout shown in FIG. 2a adopted by Ledergerber to create a horizontal electric field.

Referring to the block diagram shown in FIG. 1, circulator A designated by 2 is for protecting the magnetron oscillator 1, whereas circulator B designated by 6 is provided to insure isolation of the resonator 8 from the stub tuner 5. The stub tuner 5 is provided for varying the incident energy to be launched into the resonator 8. Directional coupler A designated by 3 is provided so that the energy supplied from the magnetron oscillator 1 and the energy reflected by the stub tuner are read on the incident and reflected wave power meter 4, thereby indicating the effective energy that will be supplied to the resonator 8, Directional coupler B designated by 7 is provided chiefly for the purpose of matching the resonator 8 by monitoring with the spectrum analyzer 9 the frequency spectrum of the microwave being reflected from the resonator 8.

Figure 3A:
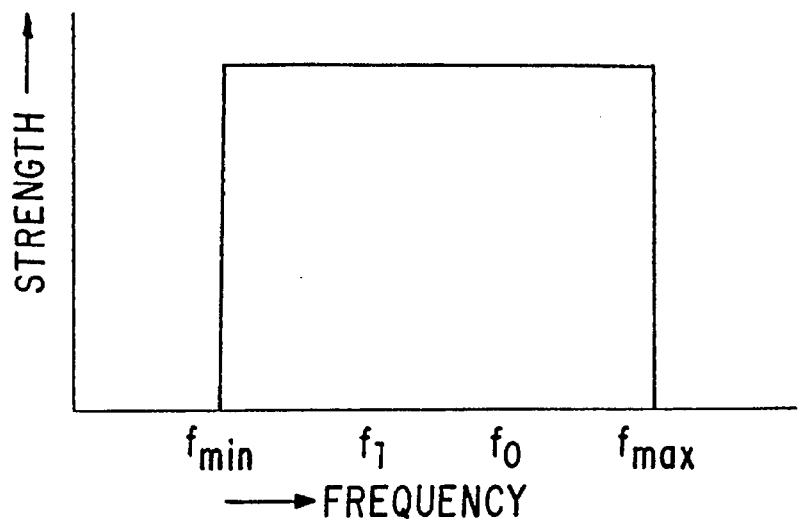
FIG. 3 illustrates the shift in the resonant frequency of a resonator in the presence of small droplets by comparing the frequency spectra of microwaves to be launched into the resonator (FIG. 3a), those reflected from the resonator as a result of absorption due to resonance in the absence of small droplets (FIG. 3b), and those reflected from the resonator as a result of absorption due to resonance in the presence of the small droplets.
Figure 3B:
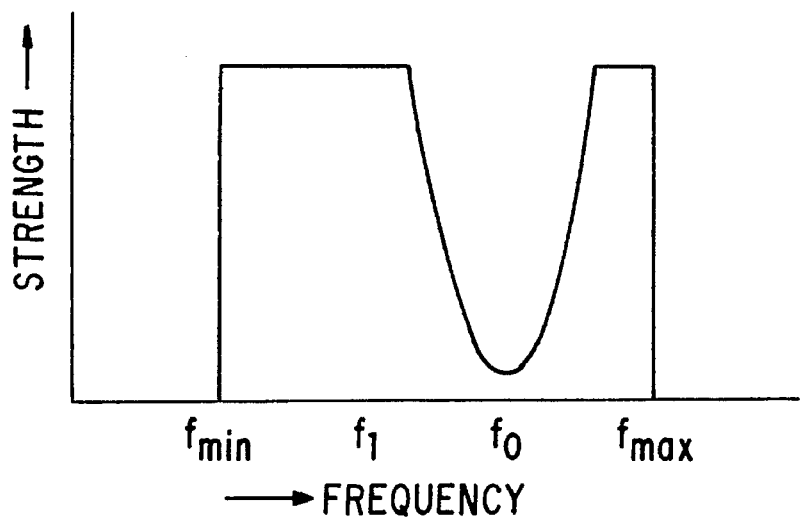
Figure 3C:
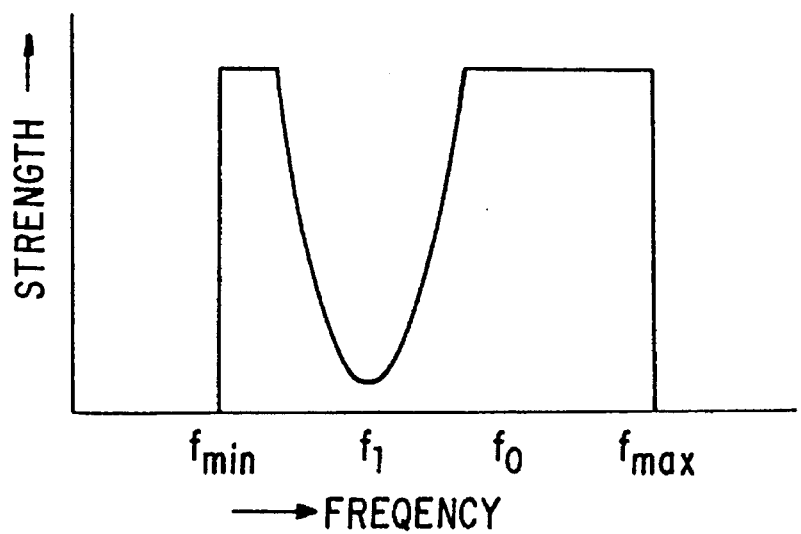

Matching of the resonator 8 is roughly accomplished by combining the width of the iris provided at the entrance to the resonator with the length of the resonator. However, considering that the resonant frequency of the system varies with the temperature of the resonator, the position of the quartz tube and the presence or absence of small droplets, the quartz rod 14 for fine tuning of the resonant state is moved up and down by means of the drive mechanism 15 with the spectrum of the reflected microwaves from the resonator being monitored with the spectrum analyzer, so that the resonant frequency will lie within the frequency spectrum of the incident microwaves (defined by minimum value $f_{min}$ and maximum value $f_{max}$) as shown in FIG. 3. In addition, the center of the resonant frequency for the case where there are no small droplets in the system ($f_0$ in FIG. 3*b*) differs from the value for the case where such small droplets are present in the system ($f_1$ in FIG. 3*c*) and the latter is lower than the former by about 0.7 MHz. Therefore, in the warmup process of resonating the system before starting to have the small droplets fall down, the quartz rod 14 for fine tuning of the resonant state must be manipulated to insure that $f_0$ is positioned in such a way that both $f_0$ and $f_1$ will lie between $f_{min}$ and $f_{max}$.

Such fine tuning of the resonant state may be obviated by using microwaves having a wide frequency spectrum. However, when microwaves having a wide spectrum are to be used, the heating efficiency will deteriorate in proportion to the spectrum width and it becomes necessary to use a microwave power source having an even higher output or frequency. In the present invention, a commercial power source was adapted for achieving variations in the frequency spectrum width with a view to achieving an improvement in heating efficiency.

Discharge may occur within the resonator 8 for certain reasons such as the deviation of the path in which the small droplets will fall down, whereby the droplets are deposited on the inner surface of the quartz tube within the resonator. The discharge detector/interlocking signal transmitter 10 is provided for the purpose of detecting the occurrence of such discharge by sensing the increase in the reflected power toward directional coupler B on account of the departure from the resonant state and then transmitting a signal for interlocking the power supply unit so that the stock solution or sol will not be supplied any more.

As FIG. 2*a* shows, the resonator which is so positioned as to create a horizontal electric field (according to the Ledergerber process) produces a field intensity distribution where the intensity is zero at top and bottom ends of the resonator and maximal in the center. The velocity of small droplets falling down through the resonator is accelerated by gravity and the time over which they pass through the Position of great field intensity is comparatively short. In contrast, the resonator shown in FIG. 2*b* which is one characteristic portion of the invention and which is so positioned as to create a vertical electric field produces a field intensity distribution where the intensity is maximal at any position in the central portion of the resonator through which the small droplets pass. Hence, efficient heating is insured even at the top end of the resonator where the velocity of falling small droplets is minimal and the resonator is capable of comparable heating to the type shown in FIG. 2*a*, although it is shorter in the vertical direction.

The particles that have gelled upon dielectric heating are typically recovered into an aqueous fluid but the gel particles, which appear solid, are very low in strength and prone to deform or break. In order to avoid such deformation or breakage, the gel particles should plunge into the recovery fluid at the smallest possible rate. In this respect, the resonator used in the present invention which is shorter in the vertical direction than the Ledergerber resonator is advantageous because it reduces the chance of the deformation or breakage of gel particles, whereby the scope of its application is expanded.

The following examples are provided for the purpose of further illustrating the invention but are in no way to be taken as limiting.

EXAMPLE 1

A copper resonator (200 $mm^H \times 62$ $mm^W \times 27$ $mm^D$) was set up in such a way as to produce a horizontal electric field. A quartz tube (o.d., 10.5 mm; i.d., 7.5 mm) was placed in the center of the resonator. A microwave with an effective power of 3 kW (readings on an incident and reflected wave power meter: 5 kW for the incident wave; 2 kW for the reflected wave) was launched into the system. After the resonant frequency of the system was stabilized to lie within the incident spectrum width, the small particles of an aqueous stock solution at 2° C. (having ammonium nitrate and urea each dissolved at a concentration of 1 mol per liter) that were formed 30 mm above the top end of the resonator were allowed to fall down through a nozzle (o.d., 0.7 mm), with one drop passing per second. The small droplets that passed through the resonator were at 82° C., having experienced a temperature rise of 80K.

EXAMPLE 2

The procedure of Example 1 was repeated, except that the effective power of the launched microwave was 3.2 kW (5.0 kW for the incident wave and 1.8 kW for the reflected wave). The small droplets that passed through the resonator were at 87° C., having experienced a temperature rise of 85K.

EXAMPLE 3

A microwave with an effective power of 2.7 kW (4.6 kW for the incident wave and 1.9 kW for the reflected wave) was launched into a resonator of the same type as used in Example 1. A stock solution at 2° C. for the production of $UO_2$ particles (consisting of U, nitrate ions, urea and HMTA at respective concentrations of 1.5 mol, 2.25 mol, 1.5 mol and 1.5 mol per liter) was added dropwise to the resonator from the position 35 mm above its top end through a nozzle (o.d., 0.7 mm). The droplets were passed through the resonator and recovered into pure water the surface level of which lied 55 mm below the bottom end of the resonator. The particles thus recovered had gelled in a satisfactory way.

EXAMPLE 4

A copper resonator (55 $mm^H \times 74$ $mm^W \times 110$ $mm^D$) was set up in such a way as to produce a vertical electric field. A quartz tube (o.d., 10.5 mm; i.d., 7.5 mm) was placed in the center of the resonator. A microwave with an effective power of 3 kW (readings on an incident and reflected wave power meter: 4 kW for the incident wave; 1 kW for the reflected wave) was launched into the system. After the resonant frequency of the system was stabilized to lie within the incident spectrum width, the small particles of an aqueous stock solution at 2° C. (having ammonium nitrate and urea each dissolved at a concentration of 1 mol per liter) that were formed 30 mm above the top end of the resonator were allowed to fall down through a nozzle (o.d., 0.7 mm), with one drop passing per second. The small droplets that passed through the resonator were at 83° C., having experienced a temperature rise of 81K.

EXAMPLE 5

At the last stage of the experiment in Example 1, the nozzle was vibrated so that the path in which the small droplets were falling down would shift, causing the droplets to deposit on the inner surface of the central quartz tube. As a result, discharge occurred and the high-frequency power source and the power supply to the stock solution feeding/ small droplet forming unit were both interlocked.

The method of gelation by dielectric heating with microwaves was first applied by Ledergerber to the production of gel particles as a precursor of particulate ceramic fuels but in that method, communication frequencies of 8.2–12.4 GHz had to be used and this made it necessary to fabricate a special power source at high cost. According to the present invention, it has been demonstrated that a dielectric heating power source that operates at an engineering frequency of 2.45 GHz needs only small design changeovers to realize a method and apparatus that enable the temperature elevation of about 80K necessary to cause internal gelation of the small particles of a stock solution or sol. The present invention also uses a cavity resonator of a layout that produces a vertical electric field and this contributes a lot to the purpose of avoiding the deformation or breakage of gel particles. Additionally, the installation of a discharge detector/interlocking signal transmitter improves the safety of the overall system, thereby reducing much of the burden on the operating personnel of the gelling apparatus of the invention.

What is claimed is:

1. In a process for producing gel particles as a precursor of ceramic particles by subjecting the small droplets of a gel particle forming stock solution or sol to dielectric heating as they fall down, the improvement wherein the small droplets experiences the temperature rise necessary for gelation within a cavity resonator that employs microwaves having an engineering frequency of 2.45 GHz.

2. A process according to claim 1 wherein said mechanism for the fine tuning of the resonant state comprises a quartz tube that is inserted into or withdrawn out of said cavity resonator by means of a micrometer-type drive mechanism.

3. A process according to claim 1 wherein a mechanism for checking the resonant state with a spectrum analyzer or by other means is provided between said cavity resonator and the microwave power source.

4. A process according to claim 1 wherein a mechanism by which any abnormal discharge that occurs within said cavity resonator is detected to insure immediate interlocking of the microwave power source or any other power supply is provided between said cavity resonator and the microwave power source.

5. A process according to claim 1 wherein said ceramic particles are the particles of a ceramic fuel for use in nuclear reactors that contains at least one nuclear fuel substance selected from the group consisting of uranium, thorium and transuranic elements.

6. A process according to claim 1 wherein said temperature rise is 80K or more.

7. A process according to claim 1 wherein said cavity resonator produces an internal microwave electric field in a horizontal or vertical direction.

8. An apparatus for producing gel particles that comprises:

a power supply control unit;

a cavity resonator 8 connected to said power supply control unit by a waveguide 13;

a quartz tube 16 provided in said cavity resonator 8;

a gel particle producing stock solution or sol feeding/ small particle forming unit 11 provided above said resonator 8;

a receptacle 12 provided below said resonator 8 for receiving the formed gel particles;

a quartz rod 14 for the fine tuning of the resonant state which is provided within said resonator 8;

a mechanism 15 provided outside said resonator 8 for driving said quartz rod 14 either up or down; and said quartz rod 14 being driven by means of said drive mechanism 15 to adjust the resonant frequency of the system so that it will lie within the spectrum width of the microwave frequency.

\* \* \* \* \*